US010825350B2

(12) United States Patent
Ni

(10) Patent No.: US 10,825,350 B2
(45) Date of Patent: Nov. 3, 2020

(54) VIRTUAL REALITY DRIVER TRAINING AND ASSESSMENT SYSTEM

(71) Applicant: WICHITA STATE UNIVERSITY, Wichita, KS (US)

(72) Inventor: Rui Ni, Andover, KS (US)

(73) Assignee: Wichita State University, Wichita, KS (US)

(*) Notice: Subject to any disclaimer, the term of this patent is extended or adjusted under 35 U.S.C. 154(b) by 310 days.

(21) Appl. No.: 15/935,452

(22) Filed: Mar. 26, 2018

(65) Prior Publication Data

US 2018/0286268 A1 Oct. 4, 2018

Related U.S. Application Data

(60) Provisional application No. 62/601,690, filed on Mar. 28, 2017.

(51) Int. Cl.
| | | |
|---|---|---|
| *G09B 9/00* | (2006.01) | |
| *G09B 9/05* | (2006.01) | |
| *G09B 9/052* | (2006.01) | |
| *G06F 3/02* | (2006.01) | |
| *G06F 3/01* | (2006.01) | |
| *G02B 27/01* | (2006.01) | |

(52) U.S. Cl.
CPC .............. *G09B 9/05* (2013.01); *G02B 27/017* (2013.01); *G06F 3/011* (2013.01); *G06F 3/013* (2013.01); *G06F 3/017* (2013.01); *G06F 3/02* (2013.01); *G09B 9/052* (2013.01); *G06F 2203/0384* (2013.01)

(58) Field of Classification Search
None
See application file for complete search history.

(56) References Cited

U.S. PATENT DOCUMENTS

| | | | | |
|---|---|---|---|---|
| 5,522,018 A | * | 5/1996 | Takeda | G06T 15/405 345/422 |
| 5,660,547 A | | 8/1997 | Copperman | |
| 5,803,738 A | * | 9/1998 | Latham | B25J 9/1656 345/157 |
| 5,919,045 A | * | 7/1999 | Tagge | A63F 13/08 434/62 |
| 6,102,832 A | * | 8/2000 | Tani | G06F 3/011 482/4 |
| 6,471,586 B1 | * | 10/2002 | Aiki | A63F 13/08 463/6 |
| 2001/0045919 A1 | * | 11/2001 | Ishikawa | A47C 7/74 345/8 |

(Continued)

*Primary Examiner* — Paul A D'Agostino
(74) *Attorney, Agent, or Firm* — Stinson LLP

(57) ABSTRACT

A virtual reality (VR) based driving simulation system and method provides hazard perception training and testing. Some embodiments use a personal computing device (e.g., smartphone), a head-mounted VR headset, and a Bluetooth-connected push button keypad or other user input device. An immersive, 3D simulator enables users to experience and learn from hazardous scenarios without risking injury. Performance by a user in perceiving a hazard is compiled as a metric in a user profile stored on a server, and continued training and testing can be conducted with updated scenarios supplied by the server in accordance with the metric associated with a user.

12 Claims, 5 Drawing Sheets

(56) References Cited

U.S. PATENT DOCUMENTS

| | | | |
|---|---|---|---|
| 2002/0099257 A1* | 7/2002 | Parker | G02B 27/0093 600/27 |
| 2003/0043268 A1* | 3/2003 | Mann | A63H 30/04 348/143 |
| 2005/0014561 A1* | 1/2005 | Ouchi | A63F 13/10 463/36 |
| 2006/0040239 A1 | 2/2006 | Cummins et al. | |
| 2007/0016265 A1* | 1/2007 | Davoodi | A61F 2/68 607/48 |
| 2007/0209586 A1* | 9/2007 | Ebensberger | G09B 9/00 118/682 |
| 2008/0094351 A1* | 4/2008 | Nogami | G06F 3/016 345/156 |
| 2008/0153591 A1* | 6/2008 | Deligiannidis | G06F 3/011 463/31 |
| 2009/0011389 A1* | 1/2009 | Sizov | A63F 13/08 434/66 |

* cited by examiner

VIRTUAL REALITY DRIVER TRAINING AND ASSESSMENT SYSTEM

CROSS REFERENCE TO RELATED APPLICATIONS

This application claims the benefit of U.S. Provisional Application Ser. No. 62/601,690, filed Mar. 28, 2017, which is incorporated herein by reference.

STATEMENT REGARDING FEDERALLY SPONSORED RESEARCH

Not Applicable.

BACKGROUND OF THE INVENTION

The present invention relates in general to driving simulators, and, more specifically, to a virtual reality (VR) driving simulator with a training mode and an assessment mode.

Training of young or novice drivers is an important measure to reduce motor vehicle crashes. Hazard perception/anticipation performance, defined as a driver's ability to detect and anticipate dangerous driving situations on the road, is an effective predictor of crash risk and on-road driving proficiency. Before full licensing is granted, young drivers usually receive driving education from either adult licensed drivers (e.g., parents or close friends) or from professional instructors, or both. However, neither of the two commonly adopted education approaches has the ability to provide enough exposures to hazardous driving situations. In order to get a driver's license, novice drivers are required to understand traffic rules and to demonstrate that they can drive in various environments and successfully perform various parking maneuvers. However, most, if not all, of the training and testing are carried out under optimum conditions in which crash hazards are rare. Supplemental training experiences to train and assess novice drivers on their hazard perception and anticipation skills would be beneficial to improve handling of hazardous situations that inevitably arise once regular driving begins.

Some training tools have been developed aiming to provide intervention for the hazard perception issue for younger drivers. They are typically based on still images or video footage depicting representative driving scenarios. Participants in these programs are often required to report or use mouse clicks to identify the potential hazards or hazardous area. While helpful, such training has not become widely used, in part because there has been a lack of ecological validity in representing real world situations, a lack of engagement/interest from potential students, and a lack of a reward system.

SUMMARY OF THE INVENTION

The invention provides an immersive driving environment including many real-world hazardous scenarios presented in a manner that trains and then assesses users' situational awareness of crash hazards in a realistic driving environment. Potentially hazardous scenarios can include left turns, approaching emergency vehicles, construction impediments, disabled vehicles, and many other scenarios with the potential to result in collisions with vehicles, cyclists, pedestrians, and fixed obstacles. The inventive driving simulator can be similar in presentation to a video game in order to increase a user's engagement with the simulator. In addition to improving a young driver's skills in anticipating and reacting to potential hazards, the invention can also provide an objective assessment of a user's overall accident risk which could be useful for public agencies or insurance companies.

In one particular aspect of the invention, a virtual reality (VR) driving simulator for presenting simulated hazard events to a user comprises a VR headset mountable to a head of the user. The VR headset has a display system for presenting respective left and right images to left and right eyes of the user. A simulation controller is coupled to the display system for generating 3D animations simulating a driving sequence. A user control device is wirelessly coupled to the simulation controller for generating at least one command signal corresponding to a driving action in response to the 3D animations. The 3D animations generated by the simulation controller include a path progression sequence depicting a vehicle drive cycle including driver actions defined by the command signal. The 3D animations generated by the simulation controller also include a hazard scene introduced into the path progression sequence at a predetermined moment representing a safety risk which is dependent upon a user perception and a user reaction. The simulation controller compares the user perception to predetermined perception performance levels. The simulation controller has a training mode wherein when the a user perception is detected below a selected one of the performance levels then the hazard scene includes an instruction phase highlighting a source of the safety risk. The simulation controller also has a testing mode wherein the instruction phase is not included.

DETAILED DESCRIPTION OF PREFERRED EMBODIMENTS

Figure 1:
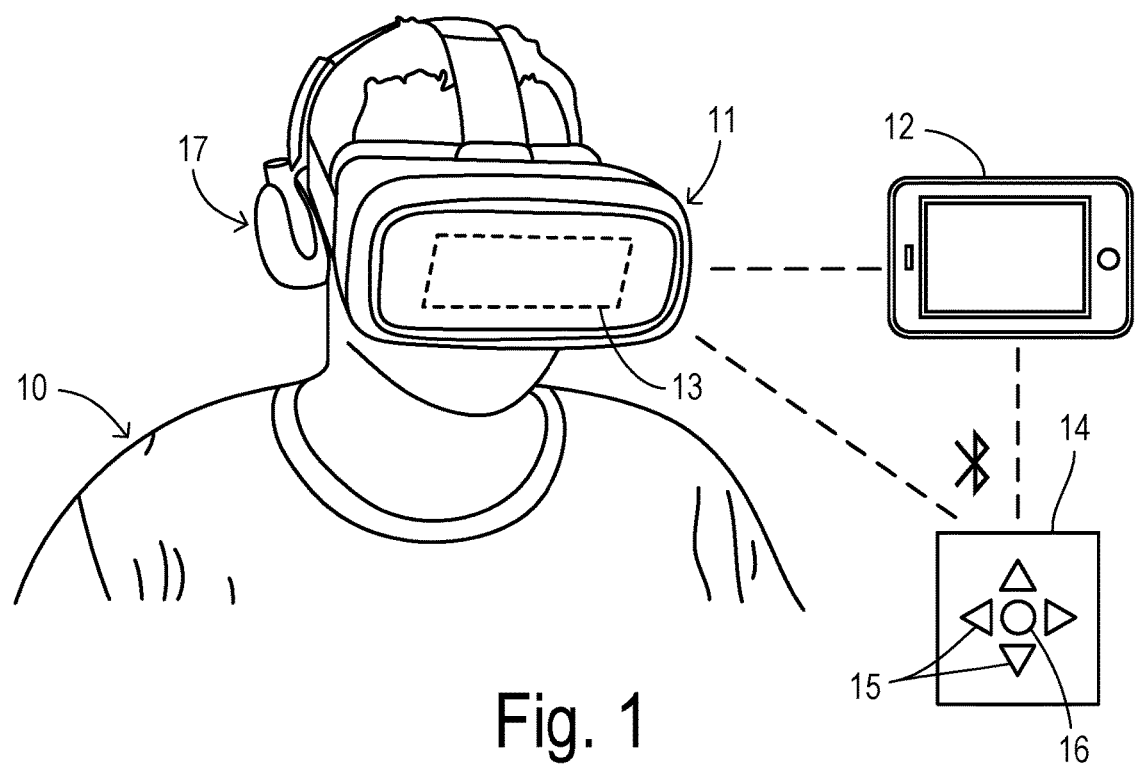
FIG. 1 is a diagram showing one preferred embodiment of the invention using a head-mounted VR display, smartphone, and handheld controller.

The invention provides a driving simulation system based on a VR headset, a computing device (e.g., personal computer, smartphone, or tablet), a manual input device (i.e., game controller), and a network server. The smartphone provides the main simulation controller executing an application program that handles the visual 3D displays, takes inputs from the input device, and processes the input and makes decisions for selecting and implementing training/testing scenarios. The VR headset is put on the head of the user, and displays an immersive 3D environment. The network server collects data from the smartphone and sends commands and scenario/hazard data to the smartphone for customizing/updating the scenarios.

The input device used for the hazard perception assessment/training can be a typical Bluetooth handheld device (e.g., similar to a gaming controller) that is sometimes supplied with a VR headset product (e.g., Google Daydream or Samsung Gear VR), or can be a specially designed steering wheel with brake/accelerator pedal (of a type as used for known Nintendo video game systems). The application program simulates driving based on user-controlled parameters, which may be a subset of all the driving control actions that a driver might use in the real world. For example, users may control the speed and moving direction of the simulated vehicle by pressing action keys (UP-forward, DOWN-backward, LEFT-left turn, RIGHT-right) on a button keypad. The video/audio content of the simulation preferably follows the user controls to virtually navigate through a 3D environment of streets, traffic signals, scenery, and other vehicles. At selected times, potentially hazardous scenes are introduced into the simulation that cover real-world incidents that raise a safety risk that needs to be perceived and acted upon by the driver. Particular types of hazard events can be updated via a network (e.g., over the Internet) so that the hazards become more challenging or difficult to detect or respond to as users make progress. The users could choose different modes of testing which will present different travel paths instead of following a fixed path.

The successful detection of the hazard can be determined in several ways. For example, users can be instructed to slow down their vehicle whenever they detect a hazard. After slowing down they may be directed to use a "point and click" action using the input device, or they can simply turn their head to face the hazard to indicate a successful detection of a hazard. For a headset with eye-tracking functions, the user's fixation would be used to detect perception of a hazard. After that, the user may be instructed to wait until the hazard disappears (e.g., a pedestrian finishes walking across the street or changes his/her moving direction and becomes a non-threat) and then proceed to drive under normal training mode. If the user fails to detect the hazard while in a training mode, the vehicle may preferably stop automatically in front of the hazard so that the user can be shown where the hazard came from before they proceed. The user can be given the option of choosing to replay the hazardous scenario from a different perspective (e.g., a bird's eye view or a top view). Under testing mode, the instruction scene will not be presented. Instead, a score may be recorded and the missed hazardous scenarios will be re-presented to the user at the end of the test.

A VR-headset-based embodiment is shown in FIG. 1. A user 10 is wearing a VR headset 11. In a standalone system, headset 11 may incorporate dual displays and a processor containing appropriate hardware and software for executing a training/testing system as described herein. In a smartphone system, headset 11 accepts a smartphone 12 in a compartment 13. Smartphone 12 or other personal mobile device provides the necessary display and computing resources. In a computer-based system, headset 11 would accepts video and audio signal from a computing device such as a gaming computer (not shown), either via cables or wirelessly. In such an embodiment, the computing device would provide the necessary display and computing resources. In any case, a handheld, wireless input device 14 (e.g., a button pad or other gaming-type device) provides manual inputs including direction buttons 15 and a select or enter button 16. Direction buttons 15 (e.g., Left, Right, Up, and Down) can be used to control a virtual speed and direction of a simulated vehicle during a driving sequence and can be used at other times to selectably highlight menu items or point to different objects, while select button 16 is used to confirm a selection. A double click of select button 16 can be used to move a test to the next trial or scenario. Smartphone 12 or a standalone VR headset 11 can be wirelessly coupled to a network server (not shown) which collects user performance data from the smartphone and provides customized scenarios to be used in the simulation application for adjusting the test or training parameters for a particular user. A Bluetooth connection may also be provided between smartphone 12 and headphones 17 which can be used to provide auditory feedback or prompts to user 10.

Figure 2:
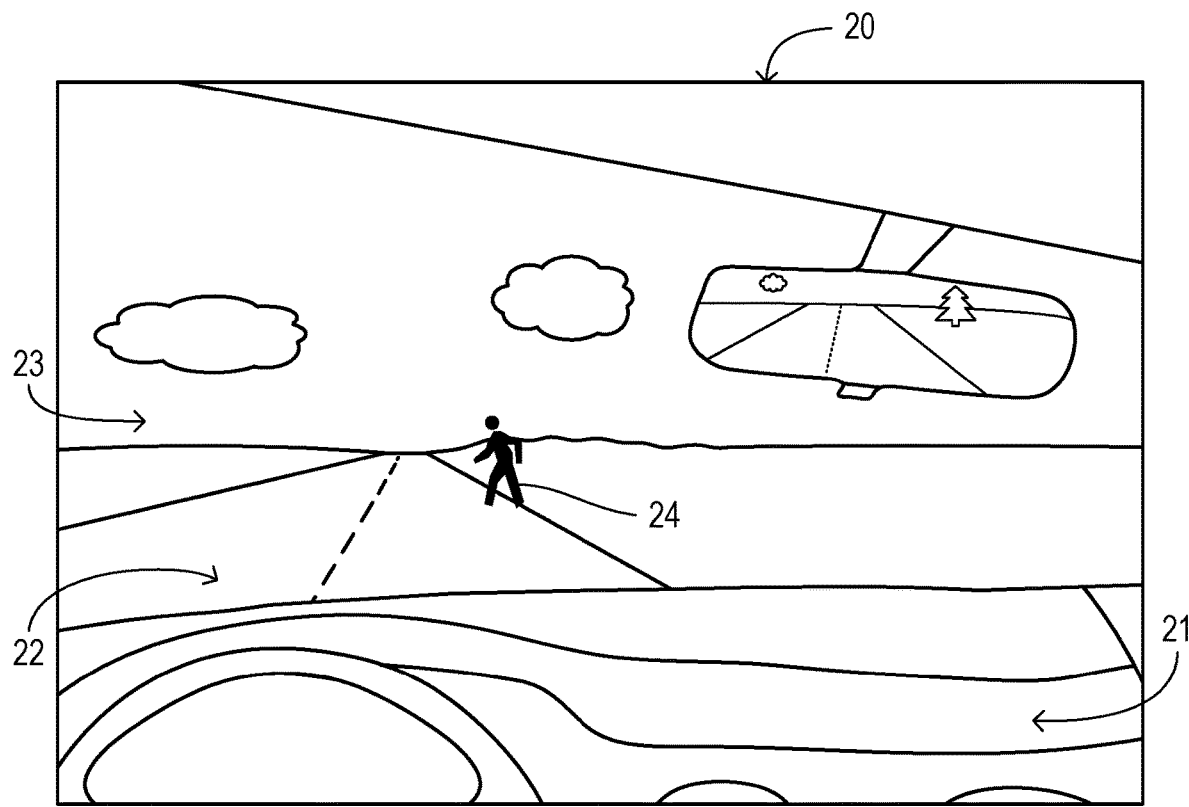
FIG. 2 depicts an animated scene as shown on a VR display.

FIG. 2 shows a frame 20 from an animation that unfolds according to a simulated driving sequence that follows a drive cycle under partial control of the user. A 3D display system is used to present respective left and right images to left and right eyes of the user in order to create an immersive environment to actively engage the user's attention and interest. The environment may represent a vehicle interior 21, a street 22, and landscape 23, for example. The 3D animations for the simulation include a path progression sequence such that the vehicle drive cycle may follow a route along predefined streets in the virtual world selected by driver actions entered on the manual input device to supply various command signals to the simulation controller.

At a moment selected by the simulation controller, the 3D animations generated by the simulation controller introduce a hazard scene into the sequence representing a safety risk. In particular, a virtual object may be introduced with a relative location and trajectory corresponding to a potential collision between the object and the simulated vehicle. For example, a pedestrian 24 is shown in FIG. 2 walking onto street 22 in front of the user which represents a safety risk wherein the amount of risk depends on the user's quick perception/recognition of the hazard and the driving actions taken in response.

Figure 3:
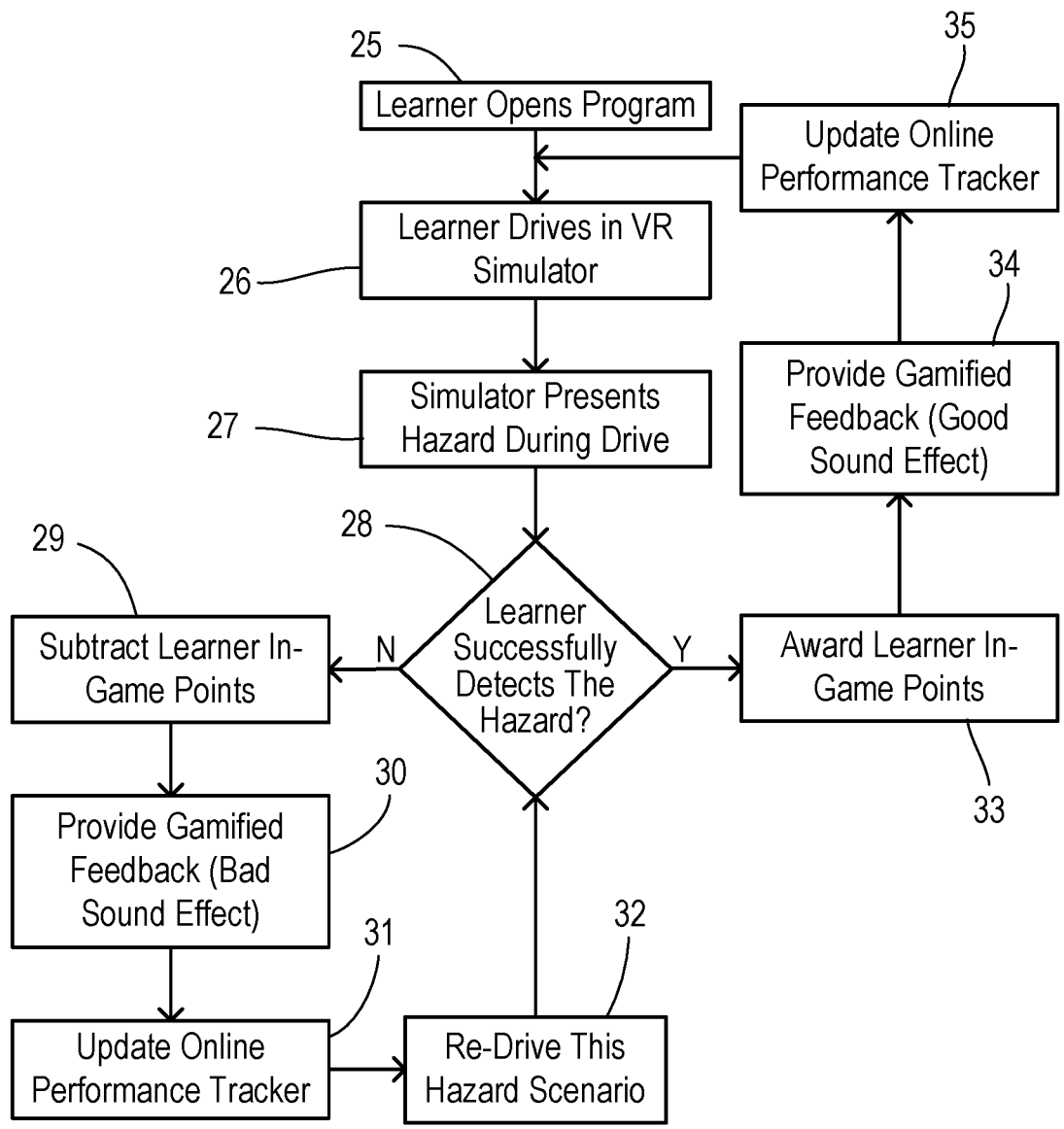
FIG. 3 is a flowchart showing one preferred embodiment for a driving simulation session for training and assessing an ability to detect driving hazards.

FIG. 3 shows a preferred operation for the simulator system wherein a user (i.e., a target Learner such as a novice driver) opens the application program in step 25. Using the preferred hardware system, the user will have set up their mobile device within a VR headset and paired the mobile device with a manual input device. In step 26, the Learner "drives" a simulated vehicle along a driving sequence. Periodically during the simulation, realistic hazards events or scenes are presented in step 27. Beginning at the moment of presenting a hazard, the application program monitors for a perception of and/or a reaction to the hazard by the Learner. A determination is made in step 28 whether the Learner successfully detected the hazard. Successful detection may be comprised of the Learner demonstrating a predetermined perception performance level. The performance levels can be binary (e.g., an ability to notice an anomaly and characterize it as a hazard within x seconds or not) or can be multi-level.

In the event that the Learner does not successfully detect the hazard in step 28, then an in-game point score maintained for the Learner is decremented in step 29. Assigning a point score to the Learner provides motivation for devoting full effort toward the task of detecting the hazards. For further motivation, a gamified sound feedback effect (e.g., a stinger sound effect with a negative connotation) is played in step 30. The Learner's online performance tracker (i.e., profile) is updated in step 31. To reinforce the correct behavior, the simulation of the drive cycle is continued in step 32 with the same hazard scene being presented again to the Learner.

When the Learner successfully detects the hazard by satisfying the predetermined performance level, their in-game point score is incremented in step 33. A gamified sound feedback effect with a positive connotation is played in step 34 and the online performance tracker is updated in step 35. The Learner carries on with the driving simulation with step 26.

Figure 4:
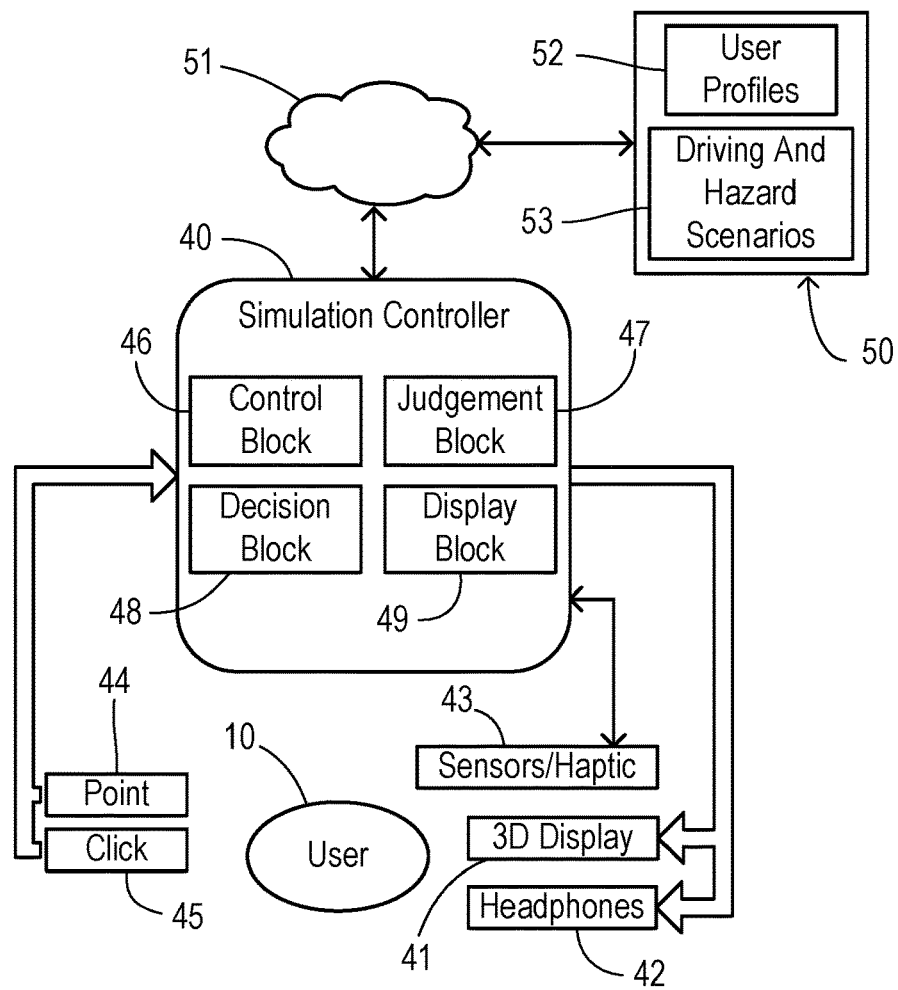
FIG. 4 is a block diagram showing one preferred system architecture of the invention.

A hardware architecture for practicing the foregoing method is shown in FIG. 4. Whether implemented using a smartphone or other platform for executing a corresponding application program, a simulation controller 40 is configured to drive a VR display 41 in a VR headset. Simulation controller 40 is preferably coupled to headphones 42 for providing instructions, performance feedback, and other information to user 10. A user input device includes a pointer 44 and clicker 45 which supply the user's manual input to simulation controller 40. Block 43 represents sensors and actuators also used by simulation controller to interface with user 10, including motion sensors (e.g., accelerometers or gyroscopes) to monitor head movements and vibration motors to generate haptic feedback.

Simulation controller 40 preferably is comprised of a control block 46, a judgment block 47, a decision block 48, and a display block 49. Control block 46 controls the overall organization and operation of the application trials and the scoring functions, for example. Judgment block 47 evaluates user input to determine whether detection of a hazard is timely or not. Judgment block 47 may generate auditory feedback to be presented to the user via headphones 42 to inform the user of the occurrence of errors. Display block 49 handles the creation and animation of the 3D environment, objects, and hazards.

In decision block 48, performance of users can be evaluated in an adaptive way in order to progress successive hazard scenes to more difficult or challenging test conditions when the user exhibits successful performance. An adaptive process helps ensure that the user continues to be challenged while avoiding frustration from having extremely difficult test conditions. In order to provide a diverse set of available driving and hazard scenarios, a central server 50 is provided which is in communication with simulation controller 40 via a network 51 (e.g., via the Internet). Central server 50 stores user profiles in a profile database 52 and stores the scenarios in a database 53. User profiles may include user achievement scores according to the "perception performance levels" compiled during simulations run in a testing mode. Based on the scores, corresponding path progression sequences and hazard scenes can be selectably transmitted to simulation controller 40 from database 53.

Figure 5:
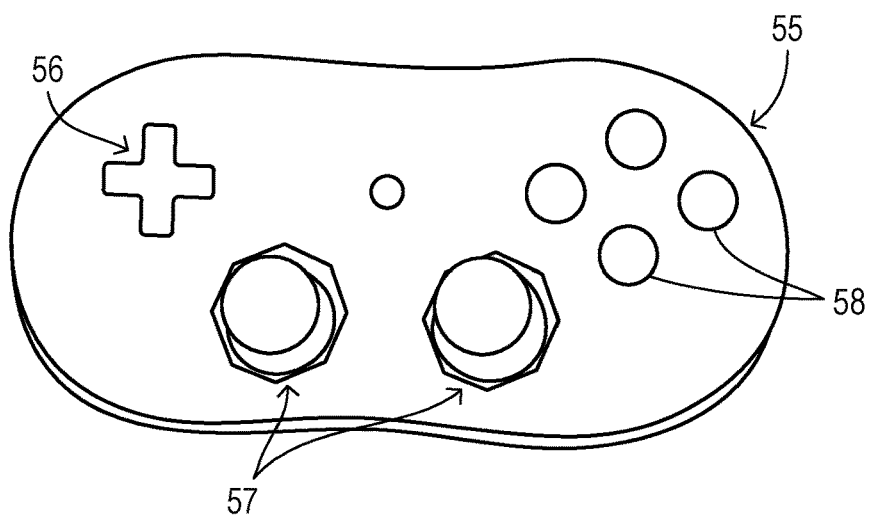
FIG. 5 is a top view of a user input device.

FIG. 5 shows an embodiment of a user input device 55 to be used as a source of command signals generated manually by the user to perform various driving actions and to control the simulation program. Directional elements on input device 55 such as a directional button pad 56 and/or joystick elements 57 can be used to perform driving actions such as steering, acceleration, and braking. The directional elements can also be used to perform a manual pointing function in which the user identifies an object in a scene or in which the user navigates through a control menu for the overall application program. Pushbuttons 58 are also provided in order to finalize a selection or to activate a menu item, for example.

Figure 6:
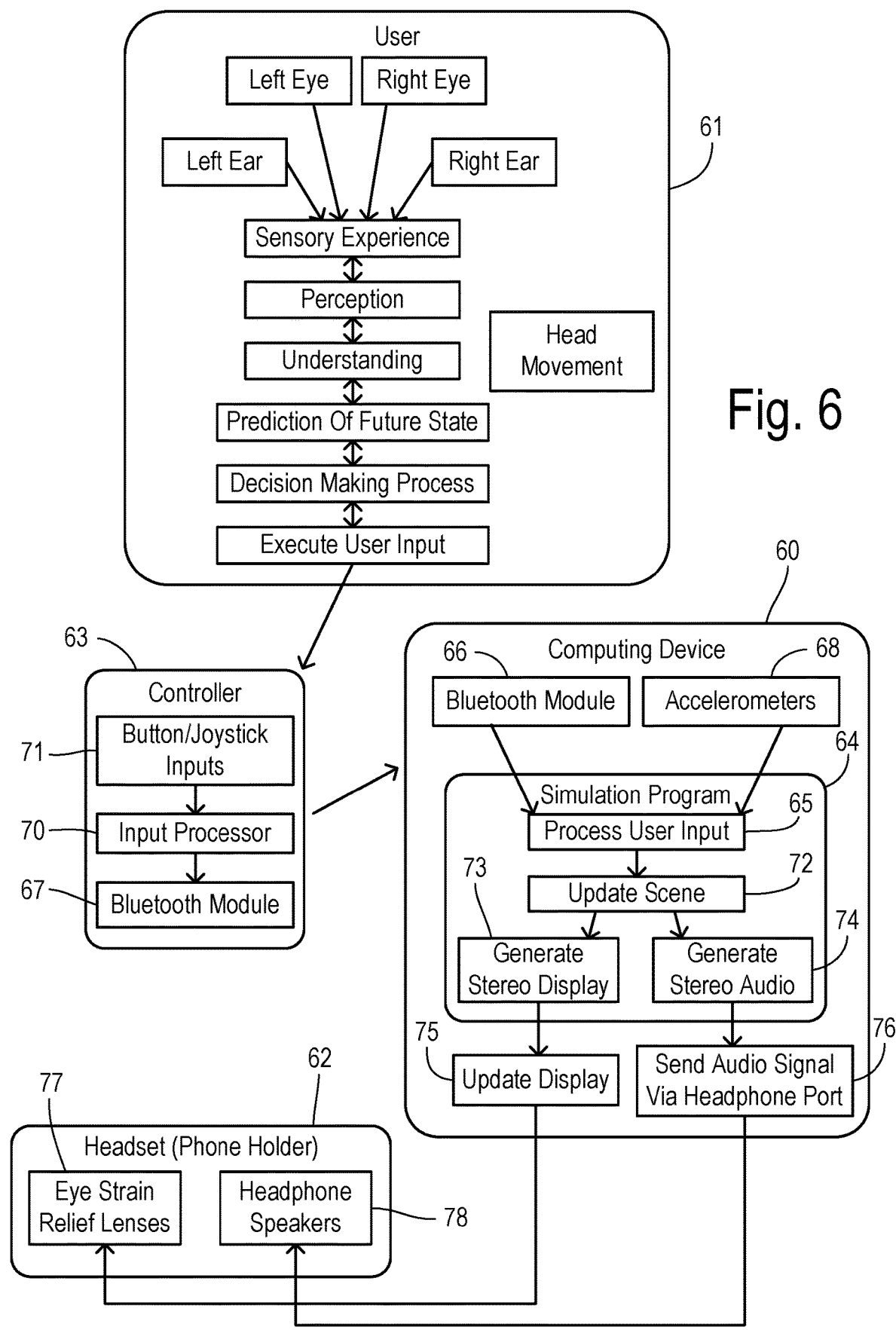
FIG. 6 is a block diagram showing a preferred embodiment of the invention having a VR system using a personal mobile device such as a smartphone.

FIG. 6 depicts another preferred apparatus of the invention in greater detail, wherein a computing device 60 (such as a smartphone) is employed by a user 61 after inserting it into (or interconnecting it with) a VR headset 62. Headset 62 is worn by the user 61 in the usual manner, and a wireless controller 63 is held by user 61 to control a corresponding simulation application program and to control a virtual vehicle in a simulated driving cycle. Computing device 60 functions as the simulation controller by executing a simulation program 64. In an input block 65, simulation program 64 processes user inputs received from a Bluetooth module 66 in communication with a Bluetooth module 67 in handheld controller 63 and from a motion sensor such as an accelerometer block 68 in smartphone 60. Accelerometers 68 respond to head movement of user 61 transmitted via headset 62. Handheld controller 63 includes an input processor 70 coupled with button and joystick inputs 71, and the resulting command signals are transmitted between Bluetooth modules 67 and 66.

During a simulated driving sequence, the user input command signals corresponding to various driving actions are used in simulation program 64 to generate an updated scene 72 according to continuously displayed 3D animations simulating the driving sequence. In addition to generating a stereoscopic display at 73, stereo audio signals 74 may be generated to enhance realism of the simulation and to provide various feedback according to the successful or the unsuccessful perception of hazards during operation of the simulation program. Smartphone 60 includes a display 75 for receiving the updated stereoscopic (left-right) display animations and a headphone port 76 for receiving the stereo audio signals. Headset 62 includes lenses 77 for focusing the stereo display to the right and left eyes of the user and headphone speakers 78 for reproducing the stereo audio signals.

Figure 7:
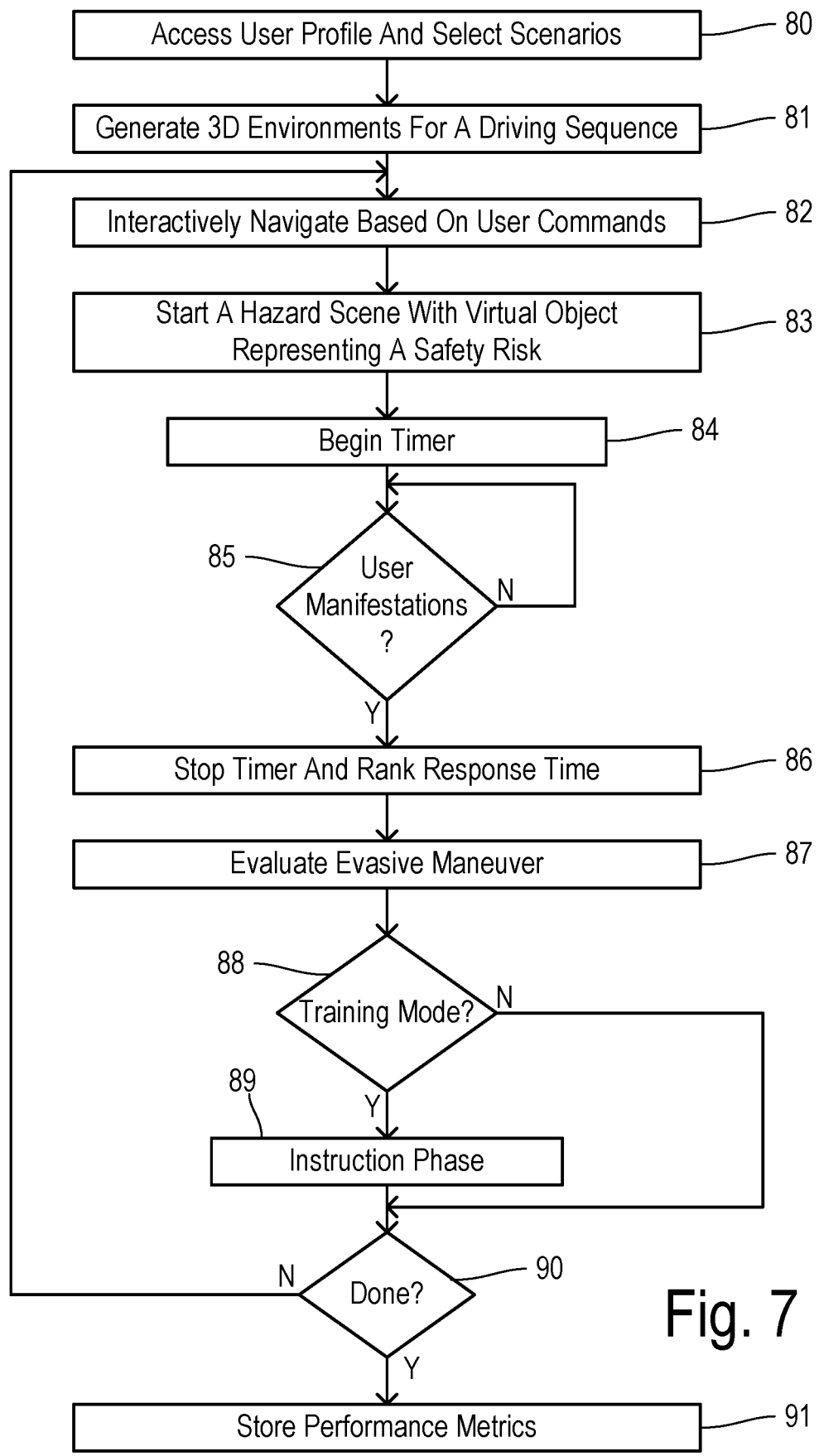
FIG. 7 is a flowchart showing a method of the invention in greater detail.

FIG. 7 shows a preferred method in greater detail wherein, after being launched, the simulation program accesses a user's profile and selects corresponding path progression sequences and hazard scenarios in step 80. Based on the virtual world containing the possible driving paths and hazard scenes to be depicted, a 3D environment for a particular driving sequence is generated in step 81. The simulation begins in step 82 with the user interactively navigating the virtual 3D environments based on user commands entered using the handheld input device. In step 83, the simulation controller starts a hazard scene at some unpredictable predetermined time, wherein the hazard scene is comprised of a virtual object representing a safety risk (typically corresponding to a potential collision based on the current relative velocities). A timer is started in step 84 at the moment when the virtual object is introduced into the simulation.

A check is performed in step 85 for any user manifestations which would be indicative of the user having perceived the hazardous virtual object. The manifestations can include any physical movement of the user which has been prompted by the appearance of the virtual object, such as the head of the user turning toward the virtual object (i.e., turning of the head to bring the virtual object toward the center of the user's field of vision) or a manipulation of the input device which matches a predetermined driving action that would be expected to evade the virtual object such as a speed-reduction command (e.g., slowing down or stopping the virtual vehicle). Thus, the physical movement can just indicate the user's perception of the potential safety risk or can correspond to the user's reaction which is directed to an action to avoid the safety risk (implicitly establishing that the hazardous virtual object was perceived).

In step 86, the timer that was started in step 84 is stopped at the moment when the first user manifestation is detected in step 85. The resulting response time may then be ranked according to whether it achieves an acceptable performance level. Optionally, the invention can also evaluate the correctness of an evasive maneuver taken by the user, if any. In step 88, a check is performed to determine whether the simulation system is operating in a training mode. If so, then an instruction phase 89 is conducted wherein the 3D animations replay the hazard scene while highlighting the virtual object which created the safety risk. The appropriate reaction which should have taken can also be displayed if desired. After completing the instruction phase (or after skipping the instruction phase if in a testing mode), then a check is performed in step 90 to determine whether the current simulation is complete. If not, then the method returns to step 82 to continue navigating through the current driving sequence. Otherwise, any resulting performance metrics from a current testing mode are stored in the user's profile in step 91.

What is claimed is:

1. A virtual reality (VR) driving simulator for presenting simulated hazard events to a user, comprising:
    a VR headset mountable to a head of the user and having a display system for presenting respective left and right images to left and right eyes of the user;
    a simulation controller coupled to the display system generating 3D animations simulating a driving sequence; and
    a user input device wirelessly coupled to the simulation controller for generating at least one command signal corresponding to a driving action in response to the 3D animations;
    wherein the 3D animations generated by the simulation controller include a path progression sequence depicting a vehicle drive cycle including driver actions defined by the command signal;
    wherein the 3D animations generated by the simulation controller include a hazard scene introduced into the path progression sequence at a predetermined moment representing a safety risk;
    wherein the simulation controller is configured to receive a user reaction input representative of a reaction of the user to the hazard scene;
    wherein the simulation controller compares the user reaction input to predetermined performance levels;
    wherein the simulation controller has a training mode wherein when the user reaction input is below a selected one of the performance levels then the simulation controller generates an instruction phase highlighting a source of the safety risk; and
    wherein the simulation controller has a testing mode wherein the instruction phase is not included.

2. The driving simulator of claim 1 wherein the hazard scene comprises a virtual object with a relative location and trajectory corresponding to a potential collision in the depicted vehicle drive cycle.

3. The driving simulator of claim 2 wherein the user reaction input indicates a time period from the predetermined moment until a physical movement by the user prompted by the virtual object.

4. The driving simulator of claim 3 further comprising a motion sensor and wherein the user reaction input comprises a motion signal output from the motion sensor in response to the head of the user turning to bring the virtual object to a center of a field of vision of the user or an eye movement of the user to bring the virtual object to the center of the field of vision.

5. The driving simulator of claim 3 wherein the user reaction input comprises a command signal generated by the user input device corresponding to a predetermined driving action that evades the virtual object.

6. The driving simulator of claim 5 wherein the command signal generated by the user input device corresponding to the predetermined driving action that evades the virtual object is comprised of a speed-reduction command signal.

7. The driving simulator of claim 6 wherein the user reaction input further comprises a signal representing a user gesture indicating the virtual object.

8. The driving simulator of claim 7 further comprising a motion sensor providing motion signals to the simulation controller and disposed in the VR headset for detecting movements of the head of the user;
    wherein the signal representing the user gesture indicating the virtual object is a motion signal from the motion sensor in response to the head of the user turning to bring the virtual object to a center of a field of vision of the user.

9. The driving simulator of claim 7 wherein the user input device includes a button pad providing a manual pointing function, and wherein the user gesture indicating the virtual object is comprised of manually pointing to an apparent position of the virtual object.

10. The driving simulator of claim 1 further comprising:
    a central server in wireless communication with the simulation controller, wherein the central server stores a user profile including data related to the user reaction input during the testing mode.

11. The driving simulator of claim 10 wherein the central server stores a plurality of path progression sequences and hazard scenes which are selectably transmitted to the simulation controller based on how the user reaction input compares with the predetermined performance levels.

12. The driving simulator of claim 1 wherein the simulation controller is comprised of a personal mobile device, wherein the VR headset includes a compartment configured to receive the mobile device, and wherein the display system is comprised of a display screen of the mobile device and a lens system of the VR headset.

* * * * *